United States Patent
Talukdar

(10) Patent No.: US 12,483,961 B2
(45) Date of Patent: Nov. 25, 2025

(54) HANDOVER OF A COMMUNICATION SESSION

(71) Applicant: NOKIA TECHNOLOGIES OY, Espoo (FI)

(72) Inventor: Anup Talukdar, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 299 days.

(21) Appl. No.: 18/250,930

(22) PCT Filed: Oct. 13, 2021

(86) PCT No.: PCT/FI2021/050682
§ 371 (c)(1),
(2) Date: Apr. 27, 2023

(87) PCT Pub. No.: WO2022/090611
PCT Pub. Date: May 5, 2022

(65) Prior Publication Data
US 2023/0388890 A1 Nov. 30, 2023

(30) Foreign Application Priority Data

Oct. 28, 2020 (FI) ..................................... 20206071

(51) Int. Cl.
*H04W 36/34* (2009.01)
*H04W 36/00* (2009.01)
*H04W 36/08* (2009.01)

(52) U.S. Cl.
CPC ..... *H04W 36/34* (2013.01); *H04W 36/00837* (2018.08); *H04W 36/08* (2013.01)

(58) Field of Classification Search
CPC H04W 36/34; H04W 36/00837; H04W 36/08
See application file for complete search history.

(56) References Cited

U.S. PATENT DOCUMENTS 9,578,557 B2    2/2017   Miklós et al.
10,257,234 B2   4/2019   Lee
(Continued)

FOREIGN PATENT DOCUMENTS

EP            3557907 A1    10/2019
WO   WO 2018/085049 A1   5/2018
WO   WO 2020/089511 A1   5/2020

OTHER PUBLICATIONS

"3rd Generation Partnership Project; Technical Specification Group Radio Access Network; NG-RAN; Architecture description (Release 16)", 3GPP TS 38.401 V16.1.0, (Mar. 2020), 50 pages.
(Continued)

*Primary Examiner* — Justin Y Lee
(74) *Attorney, Agent, or Firm* — ALSTON & BIRD LLP

(57) ABSTRACT

An apparatus, method and computer program product for: initiating a handover process for moving the communication session from a first access node to a second access node, interrupting the handover process in response to determining that at least one operation is to be performed by a transceiver, causing the transceiver to perform the at least one operation using the communication session with the first access node, and resuming the handover process in response to determining that the at least one operation is completed.

20 Claims, 3 Drawing Sheets

(56) References Cited

U.S. PATENT DOCUMENTS

| | | | |
|---|---|---|---|
| 2017/0055197 A1* | 2/2017 | Shukair | H04W 36/304 |
| 2019/0098539 A1 | 3/2019 | Zhang et al. | |
| 2019/0104452 A1 | 4/2019 | Park | |
| 2019/0239129 A1 | 8/2019 | Tidestav et al. | |
| 2020/0045596 A1 | 2/2020 | Liu et al. | |
| 2020/0296633 A1 | 9/2020 | Michalopoulos et al. | |
| 2023/0262099 A1* | 8/2023 | Yang | H04L 47/826 370/331 |

OTHER PUBLICATIONS

"3rd Generation Partnership Project; Technical Specification Group Radio Access Network; NR; Requirements for support of radio resource management (Release 16)", 3GPP TS 38.133 V16.3.0, (Mar. 2020), 1169 pages.

"3rd Generation Partnership Project; Technical Specification Group Services and System Aspects; Service requirements for cyber-physical control applications in vertical domains; Stage 1 (Release 17)", 3GPP TS 22.104 V17.2.0, (Dec. 2019), 76 pages.

International Search Report and Written Opinion for Patent Cooperation Treaty Application No. PCT/FI2021/050682 dated Jan. 17, 2022, 13 pages.

Mediatek Inc., "Single active protocol stack and dual active protocol stacks to reduce HO interruption", 3GPP TSG-RAN WG2 Meeting #105, R2-1900443, (Feb. 25-Mar. 1, 2019), 6 pages.

Nokia et al., "Potential Solutions for Reducing Service Interruption in NR Handover", 3GPP TSG-RAN WG2 Meeting #105, R2-1900609, (Feb. 25-Mar. 1, 2019), 5 pages.

Nokia et al., "Simultaneous Connectivity Handover with Single Uplink Operation", 3GPP TSG-RAN WG2 Meeting #105, R2-1900618, (Feb. 25-Mar. 1, 2019), 5 pages.

Notice of Allowance for Finland Application No. 20206071 dated Oct. 7, 2021, 3 pages.

Office Action for Finland Application No. 20206071 dated May 7, 2021, 6 pages.

Qualcomm Incorporated, "Control Plane handling and procedures to support Dual Connectivity Role Switch (DCRS) based HO", 3GPP TSG-RAN WG2 Meeting #105, R2-1900359, (Feb. 25-Mar. 1, 2019), 4 pages.

\* cited by examiner

HANDOVER OF A COMMUNICATION SESSION

CROSS-REFERENCE TO RELATED APPLICATIONS

This application is a national phase entry of International Application No. PCT/FI2021/050682, filed Oct. 13, 2021, which claims priority to Finnish Application No. 20206071, filed Oct. 28, 2020, the contents of which are hereby incorporated by reference in their entirety.

TECHNICAL FIELD

The present application relates generally to a handover of a communication session. More specifically, the present application relates to interrupting a handover of a communication session.

BACKGROUND

Cyber-Physical Systems (CPS) comprise integrations of computation, networking, and physical processes. Cyber-physical control applications, such as industrial automation, also referred to as Industrial Internet over Things (IIoT) services, where the end devices communicate via a cellular communication system such as 5G NR face stringent requirements in terms of being ultra-reliable, dependable with a high communication service availability and low or very low end-to-end latency.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: initiating a handover process for moving the communication session from a first access node to a second access node, interrupting the handover process in response to determining that at least one operation is to be performed by a transceiver, causing the transceiver to perform the at least one operation using the communication session with the first access node, and resuming the handover process in response to determining that the at least one operation is completed.

According to a second aspect of the invention, there is provided a method comprising: initiating a handover process for moving the communication session from a first access node to a second access node, interrupting the handover process in response to determining that at least one operation is to be performed by a transceiver, causing the transceiver to perform the at least one operation using the communication session with the first access node, and resuming the handover process in response to determining that the at least one operation is completed.

According to a third aspect of the invention, there is provided a computer program comprising instructions for causing an apparatus to perform at least the following: initiating a handover process for moving the communication session from a first access node to a second access node, interrupting the handover process in response to determining that at least one operation is to be performed by a transceiver, causing the transceiver to perform the at least one operation using the communication session with the first access node, and resuming the handover process in response to determining that the at least one operation is completed.

According to a fourth aspect of the invention, there is provided an apparatus comprising at least one processor and at least one memory including computer program code, the at least one memory and the computer program code configured to with the at least one processor, cause the apparatus node at least to: initiate a handover process for moving a communication session from a first access node to a second access node, interrupt the handover process in response to determining that at least one operation is to be performed by a transceiver, cause the transceiver to perform the at least one operation using the communication session with the first access node, and resume the handover process in response to determining that the at least one operation is completed.

According to a fifth aspect of the invention, there is provided a non-transitory computer readable medium comprising program instructions for causing an apparatus to perform at least the following: initiating a handover process for moving the communication session from a first access node to a second access node, interrupting the handover process in response to determining that at least one operation is to be performed by a transceiver, causing the transceiver to perform the at least one operation using the communication session with the first access node, and resuming the handover process in response to determining that the at least one operation is completed.

According to a sixth aspect of the invention, there is provided a computer readable medium comprising program instructions for causing an apparatus to perform at least the following: initiating a handover process for moving the communication session from a first access node to a second access node, interrupting the handover process in response to determining that at least one operation is to be performed by a transceiver, causing the transceiver to perform the at least one operation using the communication session with the first access node, and resuming the handover process in response to determining that the at least one operation is completed.

According to a seventh aspect of the invention, there is provided a system comprising means for performing: initiating a handover process for moving the communication session from a first access node to a second access node, interrupting the handover process in response to determining that at least one operation is to be performed by a transceiver, causing the transceiver to perform the at least one operation using the communication session with the first access node, and resuming the handover process in response to determining that the at least one operation is completed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to packet delivery during handover of a communication session. More specifically, example embodiments relate to interrupting a handover process for performing at least one operation.

According to an example embodiment, an apparatus is configured to initiate a handover process for moving a communication session from the first access node to a second access node, interrupt the handover process in response to determining that at least one operation is to be performed by a transceiver, cause the transceiver to perform the at least one operation using the communication session with the first access node, and resume the handover process in response to determining that the at least one operation is completed.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
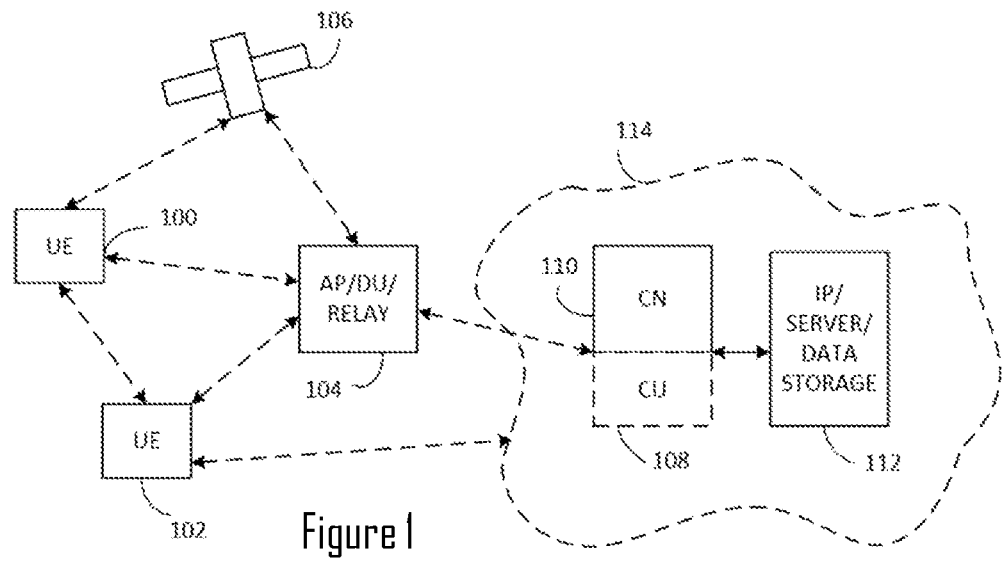
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The plurality of antennas or antenna elements may be co-located or distributed. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

A 5G network is designed to address enhanced mobile broadband (eMBB) services for consumer devices, Internet of Things (IoT) communication and connected cyber physical systems (CPS) such as industrial automation where terminal devices communicate via a cellular communication system such as a 5G network. Industrial automation may be referred to as Industrial Internet of Things (IIoT).

There are stringent requirements for deterministic CPS services such as IIoT in terms of maximum latency ranging from less than 1 msec to 100s of msecs. A message delayed beyond the maximum latency is considered lost.

A handover procedure may cause an interruption in a data packet transfer between a terminal device and the network and, therefore, in order to avoid loss of packets, packet delivery may be delayed until a completion of the handover. However, considering the stringent requirements for IIoT, delaying a handover procedure may cause exceeding the allowed maximum latency, thereby causing a loss of data packets.

Figure 2:
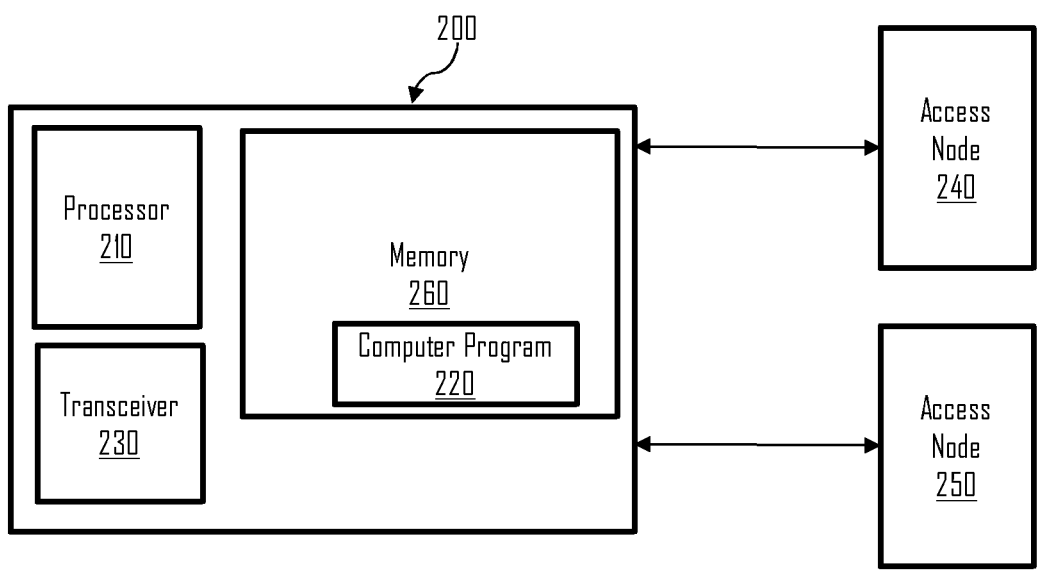
FIG. 2 shows a block diagram of an example device in which examples of the disclosed embodiments may be applied.

FIG. 2 is a block diagram depicting an apparatus 200 operating in accordance with an example embodiment of the invention. The apparatus 200 may be, for example, an electronic device such as a chip, chipset, an electronic module, a radio module or a terminal device.

The apparatus 200 comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Universal Serial Bus (USB) stick, a Compact Disc (CD), a Compact Disc Read-Only Memory (CD-ROM), a Digital Versatile Disk (DVD) or a Blu-ray disk.

According to an example embodiment, the apparatus 200 comprises a terminal device. A terminal device may comprise user equipment (UE) such as a smartphone, a tablet computer, or the like.

The apparatus 200 may be configured to establish a communication session with a first access node 240 and/or a second access node 250. The first access node 240 and the second access node 250 may comprise, for example, a radio access network (RAN) such as a gNodeB.

Establishing a communication session may comprise establishing a bearer for carrying signals and/or data between the apparatus 200 and an access node such as the first access node 240 and/or the second access node 250. The communication session may comprise, for example, a data communication session such as a packet data unit (PDU) session.

A bearer is a telecommunication service that is used for transferring user data and/or control signals between two pieces of equipment. There are different types of bearers: a data radio bearer (DRB) configured to transfer data, a signal radio bearer (SRB) configured to carry signalling data and a radio bearer between a radio access network (RAN) and user equipment (UE). In other words, a bearer is a tunnel used for connecting UE to Packet Data Networks (PDN) such as the internet. Different bearer services may differ by their information transfer characteristics (e.g. data transfer rate, direction(s) of data flow, type of transfer and/or other physical characteristics), methods of accessing the service, interworking requirements and other general attributes.

According to an example embodiment, the apparatus 200 is configured to communicate with the first access node 240 and the second access node 250 using a transceiver 230. The transceiver 230 is configured to transmit and receive radio signals. According to an example embodiment, the apparatus 200 is configured to communicate with the first access node 240 and the second access node 250 using a single transceiver 230. In the example of FIG. 2, the apparatus 200 comprises a transceiver 230. Alternatively, the apparatus 200 may be operatively connected to a transceiver 230 separate from the apparatus 200.

Without limiting the scope of the claims, an advantage of communicating with a first access node and a second access node using a single transceiver is reduced material costs. Another advantage is reduced energy consumption.

In the example of FIG. 2, it is assumed that the first access node 240 comprises a first RAN and the second access node 250 comprises a second RAN.

RAN functions may be divided into a central unit (CU) and one or more distributed Units (DU). A CU is configured to control the one or more DUs via a logical interface such as F1 interface of 3GPP specifications. The F1 interface functionally splits a RAN into a CU for upper protocol layer processing and a DU for lower protocol layer processing. A CU and a DU may comprise different network functions (NF) and the split between a CU and DUs may be used, for example, for virtualizing network functionalities. A CU is a logical node that may include functions such as transfer of user data, mobility control, radio access network sharing, positioning and session management. A DU is logical node that includes a subset of RAN functions.

NFs are typically categorized into two groups: a user plane (UP) and a control plane (CP). A CP comprises protocols for controlling sessions and a connection between user equipment (UE) and the network. A UP comprises protocols for implementing an actual session service which carries user data.

According to an example embodiment, the apparatus 200 is configured to communicate with a first access node 240 using the transceiver 230 during a communication session. For example, the apparatus 200 may be configured to receive and/or transmit data to the first access node 240 during the communication session using the transceiver 230.

According to an example embodiment, the communication session comprises a user plane data communication session. A user plane communication session is configured to carry network user traffic.

Communicating with the first access node 240 may comprise, for example, transmitting one or more data packets to the first access node 240, receiving one or more data packets from the first access node 240, sending measurement reports on signal quality to the first access node 240 and/or receiving configuration information from the first access node 240.

The first access node 240 may determine based on measurement reports received from the apparatus 200 that there is a need to reassign the communication session from the first access node 240 to the second access node 250 due to, for example, a degraded communication link between the apparatus 200 and the first access node 240. Reassigning a communication session from a first access node to a second access node may be referred to as a handover process.

According to an example embodiment, the apparatus 200 is configured to perform a handover process for moving the communication session from the first access node 240 to the second access node 250. The handover process may be performed based on configuration information received from the first access node 240. The apparatus 200 may be configured to receive the configuration information upon establishing a bearer between the apparatus 200 and the first access node 240.

According to an example embodiment, the apparatus 200 is configured to receive configuration information from the first access node 240 for maintaining the communication session with the first access node 240 concurrently with the handover process until the handover process is completed. Maintaining the communication session with the first access node 240 enables the apparatus 200 to continue receiving data from and transmitting data to the first access node 240.

According to an example embodiment, the configuration information comprises an instruction for the apparatus 200 to continue the communication session established with the first access node 240 concurrently with establishing a communication session with the second access node 250. According to another example embodiment, the configuration information comprises an instruction for the apparatus 200 to continue the communication session established with the first access node 240 concurrently with establishing a communication session with the second access node 250 until the handover process is completed.

According to an example embodiment, the apparatus 200 is configured to initiate a handover process for moving the communication session established with the first access node 240 to a second access node 250. The first access node 240 may comprise a source access node and the second access node 250 may comprise a target access node.

Initiating a handover process may comprise performing one or more functions for enabling the handover of the communication session from the first access node 240 to the second access node 250.

Functions for enabling the handover may comprise, for example, handover command processing, acquiring downlink synchronization with the second access node 250 and/or performing a random access channel (RACH) procedure for uplink synchronization and informing the second access node 250 that reconfiguration of radio resources is ready.

Acquiring downlink synchronization comprises a process for acquiring downlink synchronization between the apparatus 200 and an access node such as the second access node 250. Acquiring downlink synchronization comprises determining a time instance of a beginning of a radio frame and a beginning of an Orthogonal Frequency Division Multiplexing (OFDM) symbol.

A RACH procedure comprises a process for acquiring uplink synchronization between the apparatus 200 and an access node such as the second access node 250. Acquiring uplink synchronization comprises determining a time instance when the apparatus 200 should send data to the second access node 250.

The apparatus 200 may be configured to initiate the handover process based on one or more instructions received from the first access node 240. The one or more instructions may comprise, for example, a handover command.

According to an example embodiment, the apparatus 200 is configured to initiate the handover process in response to receiving a handover command.

The apparatus 200 may be configured to receive the handover command from the first access node 240. The handover command may be included in a radio resource control (RRC) message such as RRCReconfiguration message of 3GPP specifications. Radio resource control (RRC) is a protocol that comprises functions relating to communication between a terminal device and a RAN. For example, RRC comprises connection establishment and release functions, broadcast of system information (SI), and radio bearer establishment, reconfiguration and release between a terminal device and a RAN.

The handover command may be associated with information relating to the handover process. According to an example embodiment, the handover command is associated with information indicating that the communication session with the first access node 240 is to be maintained until the handover process is completed.

According to an example embodiment, the apparatus 200 is configured to schedule, in response to receiving the handover command, an interruption time for the handover process. Scheduling may comprise determining, based on a transmission interval of the first access node 240, a suitable interruption time for performing at least one operation.

According to an example embodiment, the apparatus 200 is configured to determine a time instance for performing the at least one operation. A time instance for performing the at least one operation may comprise, for example, an arrival time of a next data packet.

A data packet may comprise an IIoT data packet generated at a controller in a CPS system. The controller may comprise a controller comprised by the apparatus 200, a controller comprised by an access node such as the access node 240 or a separate controller operatively connected to the apparatus 200 or an access node 240.

According to an example embodiment, the apparatus 200 is configured to determine an arrival time of a next data packet. A next data packet may comprise a next downlink packet or a next uplink packet. According to an example embodiment, the apparatus 200 is configured to interrupt the handover process based on the arrival time of the data packet.

According to an example embodiment, the apparatus 200 is configured to determine the time instance for performing the at least one operation based on information relating to a time instance of a previous operation and a transfer interval. The previous operation may comprise, for example, a time instance of a previous data packet. The transfer interval may comprise a time interval at which data packets are generated at the controller.

The apparatus 200 may be configured to determine the time instance for performing the at least one operation by adding the transfer interval to the time instance of a previous performed operation.

According to an example embodiment, the apparatus 200 is configured to determine the time instance for performing the at least one operation based on a configured grant allocated by a source access node.

A configured grant may comprise a periodic allocation of uplink or downlink radio resources. Therefore, the apparatus 200 may be configured to estimate a time instance of the next data packet arrival based on a previous time instance of the configured grant.

The apparatus 200 may be configured to determine the time instance for performing the at least one operation based on bearer traffic parameters such parameters relating to data packet generation at the controller, a delay incurred by a downlink data packet in fixed and core networks and/or a processing delay when an uplink data packet is generated by a controller on the apparatus 200 side. The bearer traffic parameters may be configured at the apparatus 200 during a bearer setup.

According to an example embodiment, the apparatus 200 is configured to determine the time instance for performing the at least one operation based on a time instance when a data packet is generated at a controller and a minimum time delay incurred by the data packet. For example, a time instance for a next downlink data packet arrival may be determined by adding a minimum time delay incurred by the data packet to the time instance when the data packet is generated at the controller.

According to an example embodiment, the apparatus 200 is configured to determine the time instance for performing the at least one operation based on the time instance when a data packet is generated at the controller and a processing delay for generating the data packet by a controller on the apparatus 200. For example, a time instance for a next uplink data packet arrival may be determined by adding the processing delay for generating the uplink data packet by a controller on the apparatus 200 to the time instance when the data packet is generated at the controller.

According to an example embodiment, the apparatus 200 is configured to communicate with the first access node 240 after initiating the handover process. For example, the apparatus 200 may be configured to continue receiving downlink IIoT packets from the first access node 240 and transmitting uplink IIoT packets to the first access node 240. The apparatus 200 may be configured to communicate with the first access node 240 using the transceiver 230.

Communication with the first access node 240 after initiating the handover process may comprise, for example, providing information to the first access node 240 or switching a communication path between the apparatus 200 and the first access node 240.

According to an example embodiment, the apparatus 200 is configured to provide information relating to a state of the communication session concurrently with the handover operation. A state of the communication session may comprise, for example, channel status information (CSI) of 3GPP specifications.

According to an example embodiment, the apparatus 200 is configured to perform radio beam switching concurrently with the handover operation. Radio beam switching may comprise, for example, switching a connection from a first radio beam to a second radio beam.

According to an example embodiment, the apparatus 200 is configured to determine that at least one operation is to be performed by the transceiver 230.

The at least one operation may comprise communication with the first access node 240. According to an example embodiment, the at least one operation comprises transmitting a data packet. For example, the at least one operation may comprise transmitting, using the transceiver 230, a data packet to the first access node 240. According to another example embodiment, the at least one operation comprises receiving a data packet. For example, the at least one operation may comprise receiving, using the transceiver 230, a data packet from the first access node 240.

According to an example embodiment, the apparatus 200 is configured to interrupt the handover process in response to determining that at least one operation is to be performed by the transceiver 230.

According to an example embodiment, the apparatus 200 is configured to interrupt the handover process based on the determined time instance for performing the at least one operation. For example, the apparatus 200 may be configured to interrupt the handover process at a time instance corresponding to determined time instance for performing the at least one operation subtracted by the period of time of transition of the apparatus 200 from its current state to begin the operation.

Without limiting the scope of the claims, an advantage of interrupting a handover process is that data packets may be transmitted and/or received without a delay caused by buffering the data packet until the handover process is completed. Therefore, interrupting a handover process enables substantially uninterrupted delivery of downlink and uplink packets, for example, in IIoT services. Another advantage of interrupting a handover process is that the handover execution time is shorter than in a handover process wherein a start of handover execution is delayed while anticipating a data packet during the handover.

According to an example embodiment, the apparatus 200 is configured to cause the transceiver 230 to perform the at least one operation using the communication session established with the first access node 240.

According to an example embodiment, the apparatus 200 is configured to resume the handover process in response to determining that the at least one operation is completed.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for initiating a handover process for moving the communication session from the first access node 240 to a second access node 250, means for interrupting the handover process in response to determining that at least one operation is to be performed by a transceiver 230, means for causing the transceiver 230 to perform the at least one operation using the communication session with the first access node 240, and means for resuming the handover process in response to determining that the at least one operation is completed.

The apparatus 200 may further comprise means for initiating the handover process in response to receiving a handover command and means for communicating with the first access node 240 after initiating the handover process. The apparatus 200 may further comprise means for determining a time instance for performing the at least one operation and means for determining the time instance for performing the at least one operation based on information relating to a time instance of a previous operation and a transfer interval.

The apparatus 200 may further comprise means for receiving configuration information from the first access node 240 for maintaining the communication session with the first access node 240 concurrently with the handover process until the handover process is completed.

The apparatus 200 may further comprise means for providing information relating to a state of the communication session concurrently with the handover operation and/or perform radio beam switching concurrently with the handover operation.

Figure 3:
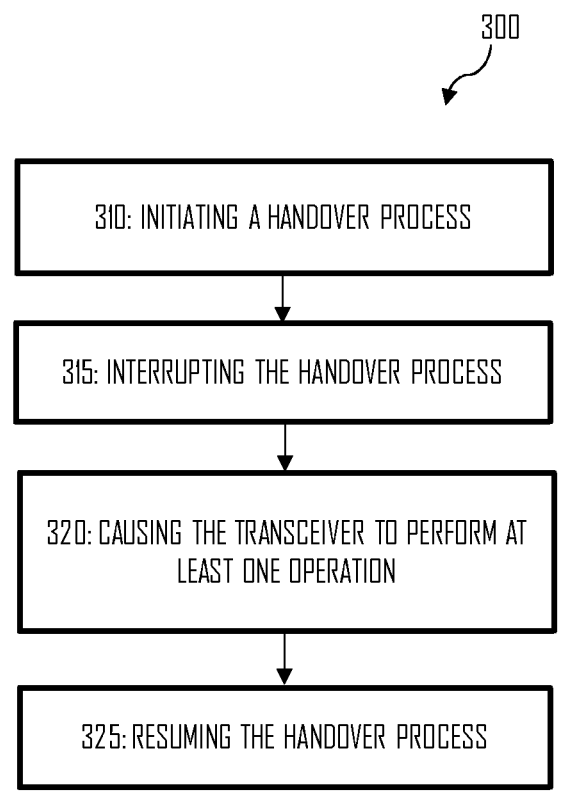
FIG. 3 illustrates an example method according to an example embodiment of the invention.

FIG. 3 illustrates an example method 300 incorporating aspects of the previously disclosed embodiments. More specifically the example method 300 illustrates a handover process. The method may be performed, for example, by the apparatus 200.

The method starts with initiating 310 a handover process for moving a communication session from the first access node 240 to a second access node 250. The handover process may be initiated in response to receiving a handover command. The handover command may be received from the first access node 240. In the example of FIG. 3, the handover command is associated with information indicating that the communication session with the first access node 240 is to be maintained until the handover process is completed.

The method continues with interrupting 315 the handover process in response to determining that at least one operation is to be performed by the transceiver 230. The handover process may be interrupted based on a determined time instance for performing the at least one operation.

The at least one operation may comprise communication with the first access node 240. For example, the at least one operation may comprise transmitting a data packet to the first access node 240 or receiving a data packet from the first access node 240.

The method further continues with causing 320 the transceiver to perform the at least one operation using the communication session with the first access node and resuming 325 the handover process in response to determining that the at least one operation is completed.

Figure 4:
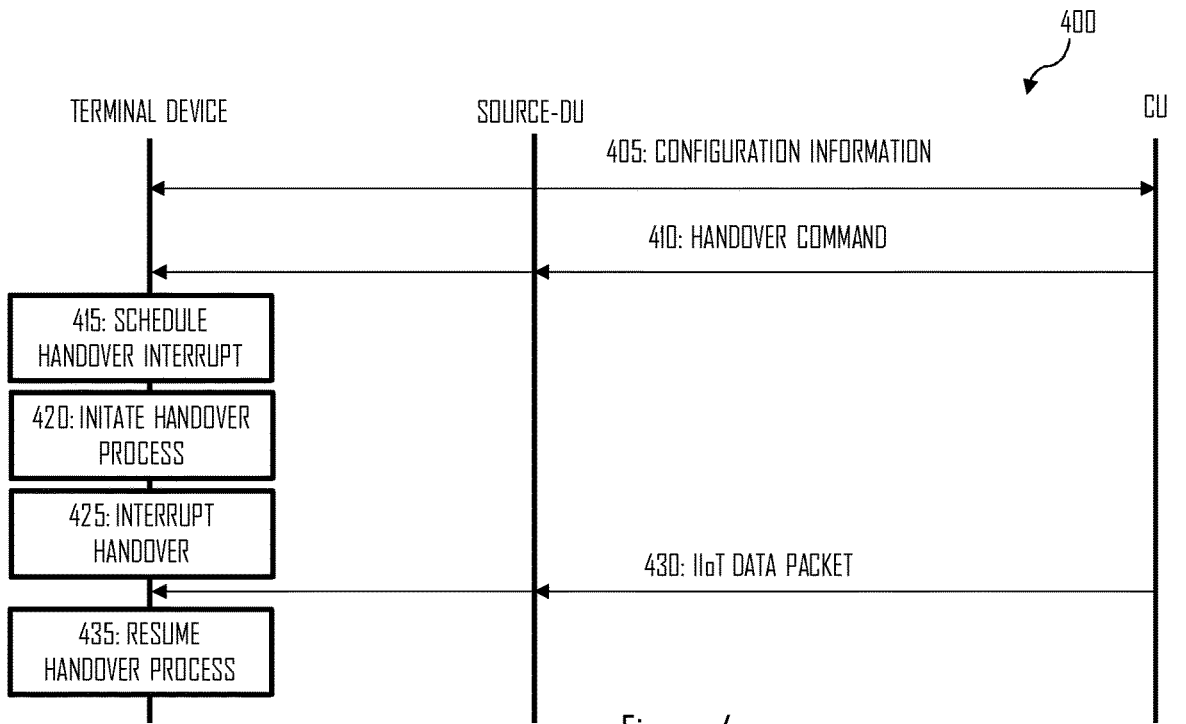
FIG. 4 illustrates an example signalling diagram according to an example embodiment of the invention.

FIG. 4 illustrate a signalling diagram 400 incorporating aspects of the previously disclosed embodiments. More specifically, the signalling diagram 400 illustrates a handover process in a centralized network architecture where a cell is served by a distributed unit (DU) and a plurality of DUs are connected to a central unit (CU). In the example of FIG. 4, it is assumed that the apparatus 200 comprises a terminal device and the first access node comprises a source DU.

In the example of FIG. 4, the CU and the terminal device establish an IIoT radio bearer with configuration information 405. The CU sends a handover command 410 to the source DU, which then forwards the handover command 410 to the terminal device. The CU may send the handover command in response to determining that the communication signal between the terminal device and the source DU is degraded.

In response to receiving the handover command 410 from the source DU, the terminal device schedules 415 a handover interrupt and initiates 420 a handover process. Scheduling the handover interrupt may comprise, for example, determining an arrival time of a next IIoT data packet.

The terminal device interrupts 425 the handover process based on the scheduled handover interrupt and receives an IIoT data packet 430 from the CU. In response to receiving the IIoT data packet, the terminal device resumes 435 the handover process.

Figure 5:
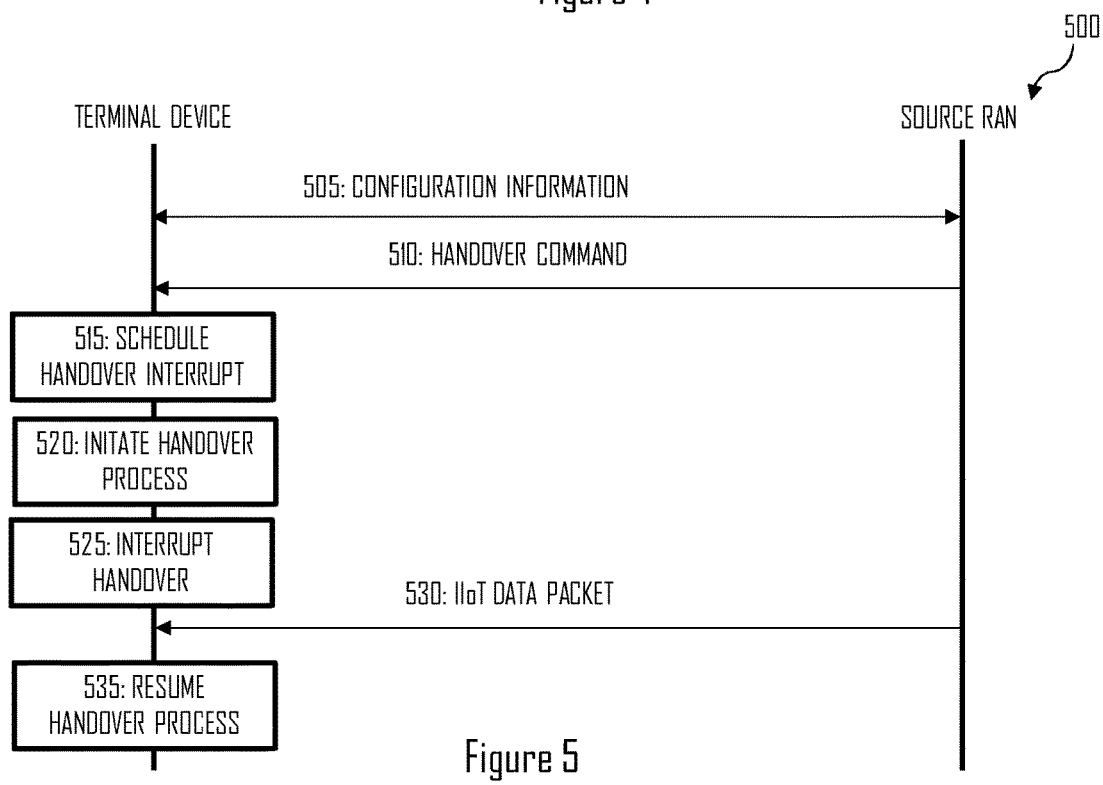
FIG. 5 illustrates another example signalling diagram according to an example embodiment of the invention.

FIG. 5 illustrate another signalling diagram 500 incorporating aspects of the previously disclosed embodiments. More specifically, the signalling diagram 500 illustrates a handover process in a distributed network architecture. In the example of FIG. 5, it is assumed that the apparatus 200 comprises a terminal device and the first access node comprises a source RAN.

In the example of FIG. 5, the source RAN and the terminal device establish an IIoT radio bearer with configuration information 505. The source RAN sends a handover command 510 to the terminal device. The source RAN may send the handover command in response to determining that the communication signal between the terminal device and the source RAN is degraded.

In response to receiving the handover command 510 from the source RAN, the terminal device schedules 515 a handover interrupt and initiates 520 a handover process. Scheduling the handover interrupt may comprise, for example, determining an arrival time of a next IIoT data packet.

The terminal device interrupts 525 the handover process based on the scheduled handover interrupt and receives an IIoT data packet 530 from the source RAN. In response to receiving the IIoT data packet, the terminal device resumes 535 the handover process.

Without limiting the scope of the claims, an advantage of interrupting a handover process for performing at least one operation is that interruption in packet delivery may be avoided. Another advantage is that using a single transceiver, material costs may be reduced. A further advantage is that, for example, a terminal device may receive and transmit packets during a handover process in order to comply with latency constraints.

Without in any way limiting the scope, interpretation, or application of the claims appearing below, a technical effect of one or more of the example embodiments disclosed herein is that the risk of exceeding maximum latency is reduced. Another technical effect is that the number of lost data packets may be reduced. A further technical effect is that radio link quality may be maintained during a handover process.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor and at least one memory storing instructions that, when executed by the at least one processor, cause the apparatus at least to:
   initiate a handover process for moving a communication session from a first access node to a second access node;
   interrupt the handover process in response to determining that at least one operation is to be performed by a transceiver;
   cause the transceiver to perform the at least one operation using the communication session with the first access node; and
   resume the handover process in response to determining that the at least one operation is completed.

2. The apparatus according to claim 1, wherein the communication session comprises a user plane data communication session.

3. The apparatus according to claim 1, wherein the instructions, when executed by the at least one processor, cause the apparatus to initiate the handover process in response to receiving a handover command.

4. The apparatus according to claim 1, wherein the instructions, when executed by the at least one processor, cause the apparatus to communicate with the first access node after initiating the handover process.

5. The apparatus according to claim 1, wherein the instructions, when executed by the at least one processor, cause the apparatus to determine a time instance for performing the at least one operation.

6. The apparatus according to claim 5, wherein the instructions, when executed by the at least one processor, cause the apparatus to determine the time instance for performing the at least one operation based on information relating to a time instance of a previous operation and a transfer interval.

7. The apparatus according to claim 5, wherein the instructions, when executed by the at least one processor, cause the apparatus to determine the time instance for performing the at least one operation based on a configured grant allocated by a source access node.

8. The apparatus according to claim 5, wherein the instructions, when executed by the at least one processor, cause the apparatus to determine the time instance for performing the at least one operation based on a time instance when a data packet is generated at a controller and a minimum time delay incurred by the data packet, or based on the time instance when a data packet is generated at the controller and a processing delay for generating the data packet by a controller on the apparatus.

9. The apparatus according to claim 1, wherein the instructions, when executed by the at least one processor, cause the apparatus to receive configuration information from the first access node for maintaining the communication session with the first access node concurrently with the handover process until the handover process is completed.

10. The apparatus according to claim 1, wherein the instructions, when executed by the at least one processor, cause the apparatus to provide information relating to a state of the communication session concurrently with the handover operation.

11. The apparatus according to claim 1, wherein the instructions, when executed by the at least one processor, cause the apparatus to perform radio beam switching concurrently with the handover operation.

12. The apparatus according to claim 1, wherein the at least one operation comprises transmitting or receiving a data packet.

13. The apparatus according to claim 1, wherein the apparatus comprises the terminal device.

14. A method comprising:
   initiating a handover process for moving a communication session from a first access node to a second access node;
   interrupting the handover process in response to determining that at least one operation is to be performed by a transceiver;
   causing the transceiver to perform the at least one operation using the communication session with the first access node; and
   resuming the handover process in response to determining that the at least one operation is completed.

15. The method according to claim 14, wherein the communication session comprises a user plane data communication session.

16. The method according to claim 14, wherein the method comprises initiating the handover process in response to receiving a handover command.

17. The method according to claim 14, wherein the method comprises communicating with the first access node after initiating the handover process.

18. The method according to claim 14, wherein the method comprises determining a time instance for performing the at least one operation.

19. The method according to claim 18, wherein the method comprises determining the time instance for performing the at least one operation based on information relating to a time instance of a previous operation and a transfer interval.

20. A non-transitory computer readable medium comprising program instructions that, when executed by an apparatus, cause the apparatus to perform at least the following:
    initiating a handover process for moving a communication session from a first access node to a second access node;
    interrupting the handover process in response to determining that at least one operation is to be performed by a transceiver;
    causing the transceiver to perform the at least one operation using the communication session with the first access node; and
    resuming the handover process in response to determining that the at least one operation is completed.

* * * * *